Patented Mar. 30, 1954

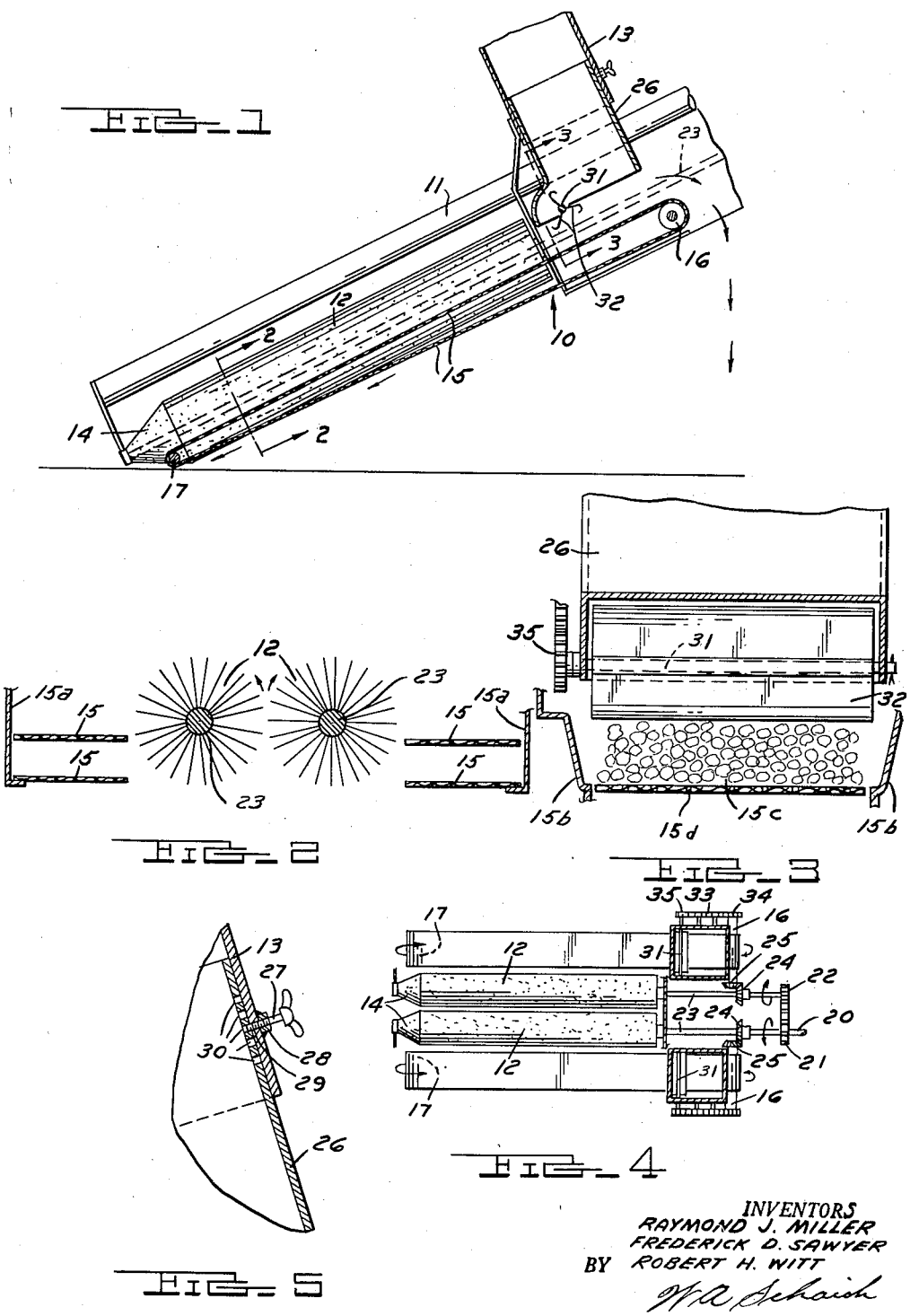

2,673,438

UNITED STATES PATENT OFFICE 2,673,438

COTTON STRIPPER

Raymond J. Miller, Detroit, Frederick D. Sawyer, Wayne, and Robert H. Witt, Royal Oak, Mich., assignors, by mesne assignments, to Ford Motor Company, Dearborn, Mich., a corporation of Delaware Application January 2, 1952, Serial No. 264,362

5 Claims. (Cl. 56—30)

The present invention relates to a crop conveying means for a harvesting machine and more particularly to a positive action mechanical feeding means utilized in conjunction with a pneumatic conveying system for the handling of an air-floatable crop, such as cotton or the like, while effecting an initial density separation of the crop from trash and other undesirable material.

In the harvesting of crops of low density, particularly cotton or the like, the use of crop stripping type harvesting machines having counter-rotating bristle brushes have been suggested, such machines typically being provided with a pneumatic conveying means for transferring the crop from the brushes to a trailing portable receptacle, such as a wagon or hopper. Such pneumatic conveying systems have normally relied upon suction exerted at the lower, forward end of the brushes to elevate the harvested crop to a blower, the blast output of which is utilized to convey the crop to the receptacle. This type of conveying means often has proved unsatisfactory under extreme operating conditions, as where the cotton, for example, contains a large amount of green unopened bolls and/or trash of higher density than the mature crop. Further, the feeding of the crop downwardly to the suction inlet by gravity flow has been difficult due to the tendency of the relatively light crop to "hang" along the length of its gravity travel.

The present invention now provides an improved crop conveying means wherein a pneumatic conveying system is utilized in connection with a positive action mechanical feed, such as a conveyer, which is utilized for the counter-gravity movement of the crop to a pickup station at which the crop is subjected to the suction of the pneumatic conveying system. Thus, the crop is mechanically fed to the suction pickup to eliminate reliance upon the gravity feeding of the light material. The degree of suction to which the crop is subjected at the pickup station is variable by simply adjusting the positioning of the suction inlet with respect to the conveying means, so that the rate of pickup may be varied in accordance with the crop yield. Also, the suction pickup may be adjusted to prevent elevation of material, such as trash and unopened bolls, of substantially greater density than the desired harvested material, and the degree of suction, determined by the inlet position, will determine the density of material to be air-floated in the pneumatic inlet air stream. To eliminate any clogging at the suction inlet, a rotary beater may be provided if desired.

It is, therefore, an important object of the present invention to provide an improved crop conveying means for a harvesting machine whereby the crop is initially mechanically fed to the inlet side of a pneumatic conveying system to eliminate the erratic feeding of formerly used gravity methods.

Another object of the present invention is the provision of an improved crop feeding device for a harvesting machine wherein an air floatable crop is mechanically conveyed from harvesting elements to a pneumatic conveying system with the mechanical feed in combination with the suction pickup of the pneumatic system effecting an initial density separation of the crop from undesired material.

It is a further important object to provide a crop conveying means for a brush-type cotton stripper wherein cotton from the stripper is fed to a pneumatic pickup by means of a rearwardly running endless belt passing beneath a pneumatic pickup which is effective to elevate cotton from the belt while leaving undesired, more dense material thereon, the belt having a series of surface perforations therethrough for increasing the aspirating effect of the pneumatic pickup.

Still another object is the provision of an improved crop feeding means for a cotton harvester including a movable supporting surface upon which harvested cotton is disposed and a suction inlet leading to the pneumatic conveying system and adjustable with respect to the moving surface for varying the pickup of cotton from the surface in accordance with the cleanliness of the harvested crop and the crop yield.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a fragmentary elevational view, with parts broken away and in section, of a stripper-type cotton harvester provided with a conveying means of the present invention;

Figure 2 is an enlarged sectional view taken along the plane 2—2 of Figure 1;

Figure 3 is an enlarged sectional view with parts shown in elevation taken along the plane 3—3 of Figure 1;

Figure 4 is a reduced, schematic view illustrating the driving means for the conveying system; and Figure 5 is an enlarged fragmentary view, with parts shown in section, illustrating the pneumatic pickup adjusting mechanism.

As shown on the drawings:

In Figure 1, reference numeral 10 refers to a cotton stripper generally similar to that illustrated and described in greater detail in the co-pending application of Robert H. Witt, Serial No. 240,566, filed August 6, 1951, and assigned to the assignee of the present invention. Generally, the stripper comprises a tractor mounted frame 11 in which is journaled a pair of longitudinally extending, counterrotating stripping brushes 12 and a rearwardly located pneumatic fan (not shown) having its inlet side connected to a suction duct 13.

Longitudinally extending upwardly and rearwardly inclined endless belts 15 are disposed immediately laterally adjacent each of the brushes 12 to receive cotton stripped by the brushes 12, the belts being effective to elevate the cotton rearwardly of the machine. It will be noted that the upper reaches of the belts are substantially parallel to the axes of the brushes, and the belts lap a rear drive roll 16 and a forward idler roll 17, the rolls forming guide elements for the belts 15, the latter roll being located immediately adjacent the forwardmost end of the associated roll in alignment with the tapered forward end 14 thereof. The driving rolls 16 lapped by the belts 15 are driven in synchronism with the rolls by the mechanism illustrated in Figure 4 including a primary drive shaft 20 carrying a gear 21 meshing with a second gear 22, the gears each being secured to a brush spindle 23. On each of the spindles 23 is mounted a bevel gear 24 driving a mating bevel gear 25 fixedly mounted on each of the rolls 16. In this manner, the rolls and associated belts are synchronized at a speed governed by the speed of the brush spindles 23.

From the foregoing description, it will be noted that the counterrotating brushes, in addition to stripping cotton from a plant interposed therebetween, will peripherally convey cotton to the belts 15 with both centrifugal and gravitational forces being effective to remove cotton from the brushes to the belts, with the cotton on the belts being conveyed rearwardly and upwardly along the brush length. The outer edges of the belts 15 are immediately adjacent side plates 15a of the frame to prevent the loss of cotton from the belt upper surfaces.

The stripped material is removed from the belts 15 rearwardly of the brushes by the pneumatic conveying means. More particularly, the removal of stripped cotton is effected by means of a pickup nozzle 26 telescopically received by the suction conduit 13 of the conveying system and telescopically movable therein towards and away from the belts. The side plates 15a are modified, as shown at 15b in Figure 3, to form outwardly flared open topped suction chambers 15c directly overlying the upper reaches of the belts 15 at the mouth of the nozzles 26. The nozzles 26 are adjustable, as best seen in Figure 5, by means of a wing bolt 27 extending through a threaded nut 28 welded to the exterior of the conduit 13, the bolt projecting through an aperture 29 on the conduit for entry into a plurality of aligned apertures 30 registerable with the aperture 29. It will be seen that, upon loosening the bolt 27 so as to clear the apertures 30, the nozzle 26 may be moved toward and away from the belt 15.

The flow of air induced within the nozzle 26 by virtue of its connection through the conduit 13 to the pneumatic conveying system of the harvester will be effective to elevate air-floatable material from the belts 15. Harvested cotton is air-floatable in this manner, while relatively more dense material, such as trash, stems, unopened green bolls and the like, will not be so elevated. The adjustment of the nozzle relative to the belt will, of course, regulate the elevating effect of air flow through the nozzle, so that a greater or less proportion of material upon the belt will be elevated. Also, in high yield cotton, the nozzle may be lowered to increase the suction effect to elevate larger amounts of cotton from the belts. The continuously running belts 15 passing beneath the nozzles 26 will convey nonelevated material rearwardly to be dumped from the belt upon its passage about the roll 16. If desired, the belt 15 may be provided with a series of surface perforations 15d through which air will be aspirated as the belt passes beneath the suction nozzle 26. The increased vertical air flow and increased aspirating effect will be appreciated.

To prevent clogging of the openings of the nozzle 26, a rotary beater 31 is mounted in the nozzle at the forward edge thereof, i. e., toward the pickup end of the belts. The rotary beater 31 is provided with a plurality of radially extending fingers 32 effective to fling any material tending to clog the nozzle 26 into the nozzle for conveyance upwardly in the air stream passing therethrough. The beater 31 is driven in synchronism with the belts 15 by means of a chain 33 lapping a sprocket 34 on the roll 16 and a second sprocket 35 on the beater shaft.

From the foregoing description, it will be appreciated that the present invention provides an improved crop conveying system for a harvesting machine whereby a relatively light, air-floatable crop may be positively conveyed by mechanical means to a suction pickup nozzle, with the mechanical conveying means and the pneumatic pickup combining to provide for the separation of the crop from trash or other more dense material. The separation is effected at the point of transition of the harvested material from mechanical conveying to pneumatic conveying. The advantages of a positive crop feed in conjunction with the large capacity of a pneumatic system and in combination with the specific gravity separation of the crop will be readily appreciated. In addition, means are provided for preventing the clogging of the suction intake.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In combination with a pair of upwardly and rearwardly inclined counterrotating stripping brushes adapted to remove cotton from a plant interposed therebetween, an endless belt extending longitudinally of said brushes throughout substantially the entire length thereof and rearwardly therebeyond, said belt being adapted to receive cotton flung centrifugally and gravitationally from said brushes, an exhaust nozzle juxtapositioned vertically above said belt rearwardly of said brushes and adjustable toward and away from said belt to vary the suction effect exerted on material carried thereon, and a rotary beater carried by said nozzle and vertically movable therewith for clearing the nozzle inlet opening of material picked up thereby from said belt.

2. In a machine for harvesting an air-floatable crop, longitudinally extending inclined stripping elements, a similarly inclined laterally juxtapositioned moving conveying surface for moving said crop longitudinally of said elements, a suction pickup nozzle immediately adjacent said surface to receive said crop from said surface as the same is floated in the air stream passing thereover, and a rotary beater carried by said pickup nozzle immediately adjacent the lowermost portions thereof for clearing the nozzle inlet of material passing therethrough.

3. In combination with a pair of counterrotating stripping brushes effective to remove cotton from a plant interposed therebetween, an endless conveyor belt positioned alongside each of said brushes and adapted to receive thereon cotton from said brushes, a pickup nozzle located along the length of each of said belts at the rearward end of said brush, said nozzles being adapted to exhaust therethrough air-floatable material including cotton on said belts, said belts having surface perforations therein accommodating the flow of air therethrough to aid in the exhaustion of air-floatable material, and means immediately rearwardly of said nozzles for drastically changing the direction of movement of said belt to centrifugally fling therefrom material not picked up by said nozzles.

4. In a machine for harvesting cotton having rotating means for stripping cotton from the plants, an endless belt-type conveyor having a conveying surface positioned adjacent said rotating means to receive stripped cotton thereon and to convey the same to a point spaced from said rotating means, and a suction pickup nozzle overlying said conveying surface at said point, said conveyor having a series of perforations therethrough for accommodating the vertical flow of air through the belt and into said nozzle to increase the aspirating effect of said nozzle.

5. In a stripper-type cotton harvesting machine having a pair of laterally spaced substantially parallel stripping elements upwardly and rearwardly inclined with respect to a horizontal plane, first guide members located immediately adjacent the forward ends of said elements, respectively, and projecting laterally outwardly therebeyond, second guide members located rearwardly of said elements, respectively and also projecting laterally outwardly therebeyond, an endless belt adjacent each of said elements, respectively, and lapping said guide members to extend substantially parallel to the respective elements and throughout substantially the entire length thereof for receiving cotton therefrom, means for driving said belts, a pickup nozzle juxtapositioned above each of said belts rearwardly of said elements and in advance of said second guide members, and means for adjusting said nozzles generally vertically to vary the suction effect thereof, so that cotton is elevated from said belts thru said nozzles while green bolls, trash and the like are centrifugally flung therefrom upon passage of said belt about said second guide member.

RAYMOND J. MILLER.
FREDERICK D. SAWYER.
ROBERT H. WITT.

References Cited in the file of this patent

UNITED STATES PATENTS

| Number | Name | Date |
|---|---|---|
| 1,069,997 | Appleby | Aug. 12, 1913 |
| 1,273,814 | Berry | July 30, 1918 |
| 1,440,642 | Stone | Jan. 2, 1923 |
| 1,722,747 | Hentz | July 30, 1929 |
| 1,731,717 | Friend | Oct. 15, 1929 |
| 1,767,979 | Hestand | June 24, 1930 |
| 1,933,922 | Morse | Nov. 7, 1933 |
| 2,538,454 | Hart | Jan. 16, 1951 |